Patented May 12, 1942

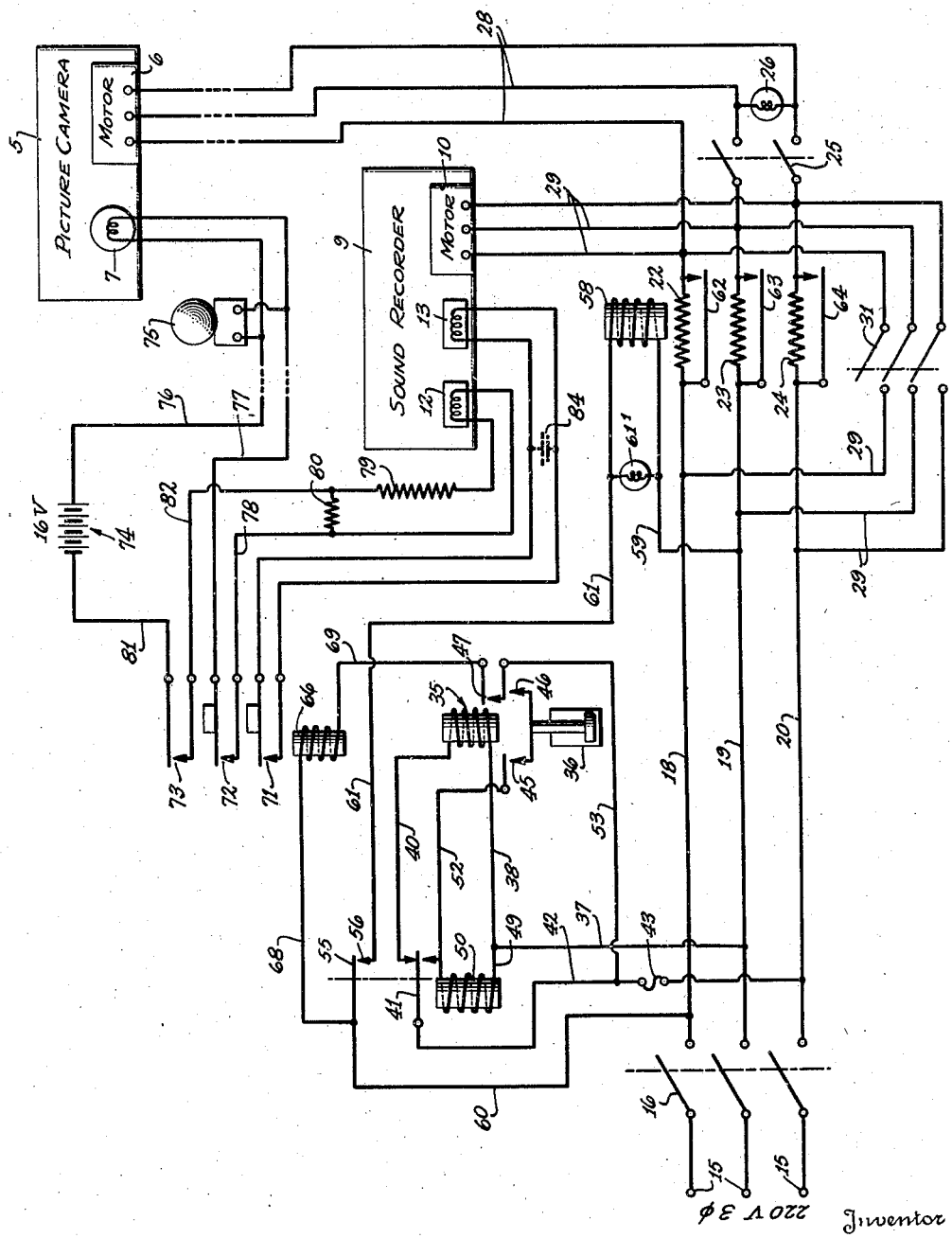

2,282,957

UNITED STATES PATENT OFFICE 2,282,957

CONTROL CIRCUITS FOR MOTION PICTURE APPARATUS

James L. Fields, Hollywood, Calif., assignor to Radio Corporation of America, a corporation of Delaware Application April 1, 1940, Serial No. 327,267

6 Claims. (Cl. 88—16.2)

This invention relates to sound recording systems and particularly to the electrical circuits for supplying power to and controlling the driving motors, marking and signaling elements of the various recording units.

In the production of motion pictures, it is well known that each particular sequence is photographed by a picture camera located at the scene of action, and the concomitant sound is simultaneously recorded by a sound recording unit generally located at a distance from the picture camera. The respective motors for driving the camera and sound recorder are usually of the synchronous interlock type which are brought up to speed simultaneously, and then operated so that the film is advanced in both the camera and sound recorder at the same rate to permit the linear combination of the films at a later time. In the use of such motors, it is desirable that they be brought up to speed gradually but not too rapidly so as not to injure the film and mechanism associated with the film drive. This action is automatically accomplished by the present invention.

Furthermore, in the art of sound recording in which separate picture cameras and sound recorders are employed and located at points distant from one another, it is common practice to indicate to the camera crew and the sound recorder operator the instant the apparatus is in condition for the action to take place. The present circuit accomplishes this result.

Also, since motion pictures are taken in a series of sequences which are cut and intercut during the editing process, it is necessary that the "takes" be not only identified, but also that start or synchronization marks be made on each film at the beginning of each respective sequence so that the cutters or editors may combine them properly. The present circuit also accomplishes this result.

The principal object of the invention, therefore, is to facilitate the recording of sound and the photographing of the related picture simultaneously.

Another object of the invention is to automatically control the starting time and acceleration of a plurality of motion picture units while providing the necessary start marks and signals to the operators of the units.

A further object of the invention is to automatically produce a delay in the acceleration time of the motors, the delay apparatus also automatically controlling the production of the starting marks and signals for the operators.

A further object of the invention is to provide a control circuit for a sound recording and picture camera system operating simultaneously and synchronously, which controls the acceleration time of the motor driven apparatus, the marking time for the films and the time of signaling the operators of the respective units.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which the single circuit diagram embodies the invention.

Referring now to the drawing, a camera 5 is shown diagrammatically as containing a motor 6 for advancing a picture negative therethrough and an auxiliary light source 7 utilized as a means for providing a mark on the picture negative at a predetermined time, as will be explained hereinafter. At 9 is shown diagrammatically a sound recorder having a motor 10 for advancing the sound negative therethrough. This sound recorder is provided with a galvanometer for modulating the light being impressed on the film, a bias winding for which is shown at 12. At 13 another winding is shown which is the shutter winding for introducing noise reduction on the film as disclosed and claimed in U. S. Patents 2,102,776, 2,102,777 and 2,102,778.

The power for operating the motors and control relays may be provided from any suitable source, such as a 220-volt, three-phase supply connected to terminals 15. The supply of power to the motors may be manually controlled by a switch 16. When the switch 16 is closed, the motors 6 and 10 are energized over three-phase conductors 18, 19 and 20, through a plurality of resistances 22, 23 and 24, after the camera motor switch 25 has also been closed. To indicate that power is being supplied to the motor 6 at the distant point when the switch 16 is closed, a signal lamp 26 is provided at the sound recorder station. The motor 6 is energized over conductors 28, while the motor 10 is energized over conductors 29. A standby switch 31 is provided to manually short-circuit the resistances 22, 23 and 24 in case of failure of the automatic system or for any other reason that manual operation is desired.

Upon the closing of switch 16, not only are the motors 6 and 10 energized over the resistances 22, 23 and 24, but a slow acting or delay relay 35, having an adjustable dashpot control 36, is energized from one phase of the three-phase power supply, this circuit extending from three-phase conductor 19, over conductor 37, conductor 38, winding of relay 35, conductor 40, switch blade 41 in its upper position, conductor 42, and through fuse 43 to three-phase conductor 20. Upon energization of the relay 35, the twin switch contacts 45 and 46 are pulled upwardly until each makes contact with its respective spring. When contacts are made at 45 and 46, a third contact simultaneously occurs at 47. The making of contacts 45 and 46 energizes a relay 50 from the same phase of the three-phase power circuit, the new energizing circuit starting from three-phase conductor 19 and extending over conductor 37, conductor 49, relay 50, conductor 52, contact 45, contact 46, conductor 53, and to three-phase conductor 20 through fuse 43.

Immediately upon completion of the last traced circuit and the energizing of relay 50, the switch blade 41 is removed from the contact of conductor 40, thus breaking the energizing circuit for the slow acting relay 35, which will break contacts at 45 and 46 and thus deenergize relay 50. However, when the switch blade 41 makes contact in its lower position, the relay 50 is again energized over a holding circuit. This holding circuit extends from three-phase conductor 19, over conductor 37, conductor 49, winding of relay 50, switch blade 41 in its lower position, conductor 42, and through fuse 43 to three-phase conductor 20. Simultaneously with the operation of switch blade 41, switch blade 55, which is mechanically connected thereto, is pulled down from its off-contact position to make contact at 56.

The making of contact between elements 55 and 56 energizes a solenoid relay 58 over a circuit from three-phase conductor 18, over conductor 60, switch blade 55, conductor 61, winding of solenoid 58, and conductor 59 to the three-phase conductor 19. The energization of this circuit is shown by a signal lamp 61', shunted across the winding of relay 58. Upon energization of the relay 58, switch blades 62, 63 and 64 are drawn upwardly to short-circuit the respective resistances 22, 23 and 24. The time required for the contacts 45 and 46 to be made after the switch 16 is thrown and the relay 35 energized, is sufficient to permit the motors 6 and 10 to uniformly accelerate up to speed or substantially so, after which the resistances are shorted out of the power line so that the motors may be supplied with full voltage to permit them to operate at synchronous speed under load.

The above-described circuit controls the starting of the motors. However, the operation of relay 35 also controls the marking and signaling portions of the system, as will now be explained. When the switch contacts 45 and 46 are made, the contact 47 is also made, as mentioned above. The making of this latter contact energizes a relay 66 over a circuit extending from three-phase conductor 18, conductor 60, conductor 68, winding of relay 66, conductor 69, through contact 47, over conductor 53 and through fuse 43 to three-phase conductor 20. The energization of relay 66 completes three contacts at 71, 72 and 73 for energizing lamp 7 in the camera and windings 12 and 13 in the sound recorder.

The closing of contacts 72 and 73 connects a 16-volt source 74 to the lamp 7 in the camera and to either a visual or audible signal in the form of a bell 75, over conductor 76, through the lamp 7 and bell 75, over conductor 77, through contact 72, over conductor 78, through galvanometer bias winding 12, through series protective resistance 79, and shunt protective resistance 80, over conductor 82, through contact 73, over conductor 81 and back to the 16-volt source 74. Thus, energization of relay 66 will fog the film in the camera by energizing lamp 7, and will indicate to the camera operator that marking has occurred at both the camera and sound recorder. This action also biases the galvanometer to either momentarily illuminate the film or remove the light therefrom in accordance with the circuit connections and operation of the galvanometer at the time, and will indicate to the recorder operator on his monitor card the marking action. It is to be noted that the leads 78 and 82 are both open to avoid modulation of the galvanometer by induced or stray currents from motor or other circuits.

Simultaneously with this operation, the closing of contact 71 by relay 66 will short-circuit the noise reduction shutter winding 13 in the sound recorder to permit a greater amount of light to be projected to the film for marking purposes, since, as described in the above-mentioned applications, the shutter is biased to a closed position during no signal conditions. To indicate this bias condition, a source of potential 84 is shown in dotted lines. This short-circuiting action will also be indicated to the operator on his monitor card. This action may be eliminated if the actuation of galvanometer 12 provides sufficient marking effect.

Thus, as explained above, as soon as the slow acting or delay relay 35 makes the contacts 45, 46 and 47, the relay 35 has served its purpose and becomes immediately deenergized. Thus, contacts 45, 46 and 47 are made only momentarily. Therefore, the energization of relay 66 is only momentary, and the making of contacts 71, 72 and 73 is, of course, of the same duration. It follows then that the actuation of lamp 7, bell 75, and winding 12 and 13 is only momentary for the purpose of providing the necessary start marks for the film editors or cutters. Also, since the delay action of relay 35 permits the film to be brought up to speed before these contacts are closed, the marking and signaling will occur when the films are running simultaneously. Even though the mechanisms are not completely up to speed, since the motors are interlocked, the markings will still serve as sync marks since the motors are brought up to speed in step.

The above-described starting and control system for a motion picture camera and sound recorder operating synchronously removes the possibility of manual error to as complete a degree as practicable. It is only necessary for an operator to close one switch after the "roll them" signal has been given, the acceleration period and the marking and signaling controls being automatically controlled in accordance with a predetermined setting. The delay period is adjustable, but when once set, will always operate in the same manner. Thus, the editors may always know about where to look for the sync marks.

What I claim as my invention is:

1. In an electrical control system, the combination of a motor, a power supply for said motor, a film advanced by said motor, a second power supply, means for reducing the voltage impressed on said motor during the acceleration period thereof, a relay having a predetermined period of delayed action, said relay being energized from said motor power supply simultaneously with the energization of said motor, and means actuated a predetermined time after energization of said relay for impressing full-line voltage on said motor and marking said film, said full-line voltage-impressing means being energized from said motor power supply, and said marking means being energized from said second power supply.

2. In an electrical control system, the combination of a motor at a local position, a second motor at a distant position, respective films advanced by said motors, a power source for said motors, a second power source, means for impressing a portion of the voltage of said power source on said motors during acceleration of said motors and films, a relay energized from said power source for said motors simultaneously with the energization of said motors, said relay operating to make contact after a predetermined time after energization, means energized from said power source for said motors by said contact of said relay for impressing the full-line voltage on said motors, and means actuated by said contact for marking the films advanced by each of said motors, said last-mentioned means being energized from said second power source.

3. An electrical control system in accordance with claim 2 in which the actuation of said time-delay relay simultaneously energizes a plurality of relays, one of said plurality of relays controlling the impression of full-line voltage on said motor, deenergizing said time-delay relay, and simultaneously locking itself in energized position.

4. An electrical control system in accordance with claim 2 in which the actuation of said time-delay relay simultaneously actuates a plurality of relays, one of said relays controlling the momentary energization of said marking means for said films and a signal device for indicating that said marking means have functioned.

5. An electrical control system comprising a plurality of motors adapted to advance respective motion picture films, respective means for marking each of said films, means for energizing said motors at a voltage below normal full-line voltage, means for simultaneously energizing a slow-acting delay relay, a second relay adapted to impress full-line voltage on said motors, a third relay directly energized by the actuation of said delay relay, actuation of said third relay energizing said second relay and deenergizing said delay relay, and a fourth relay energized by the actuation of said delay relay, the actuation of said fourth relay energizing said film marking means.

6. An electrical control circuit in accordance with claim 5 in which said film marking means comprises means for momentarily light impressing said films during actuation of said fourth relay, and means for producing a signal indicating the operation of said marking means.

JAMES L. FIELDS.